Jan. 16, 1962 W. I. BALLENTINE, JR., ETAL 3,016,875
APPARATUS FOR COATING PIPE
Filed Dec. 11, 1958 2 Sheets-Sheet 1
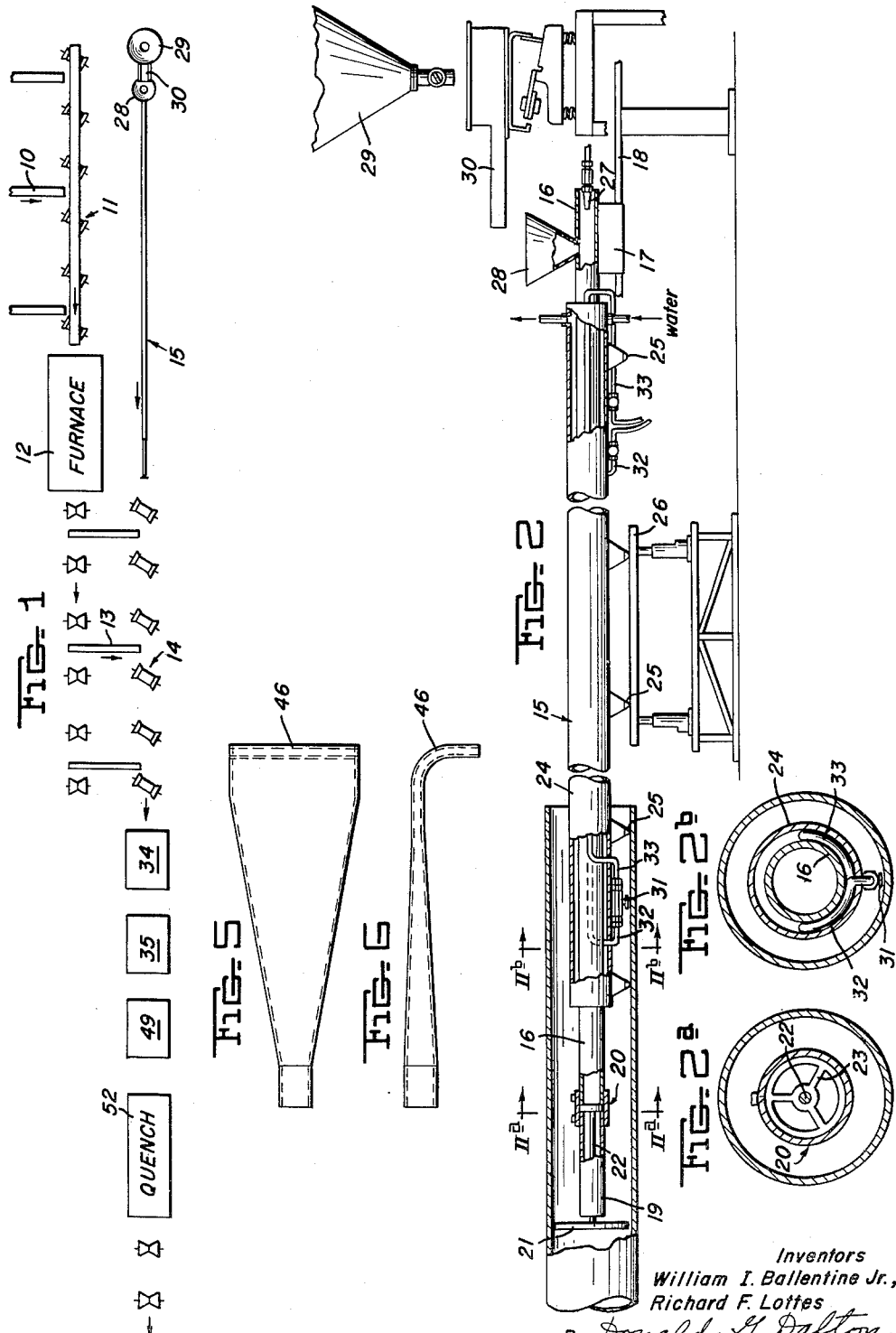
Inventors
William I. Ballentine Jr.,
Richard F. Lottes
By Donald G. Dalton
Attorney

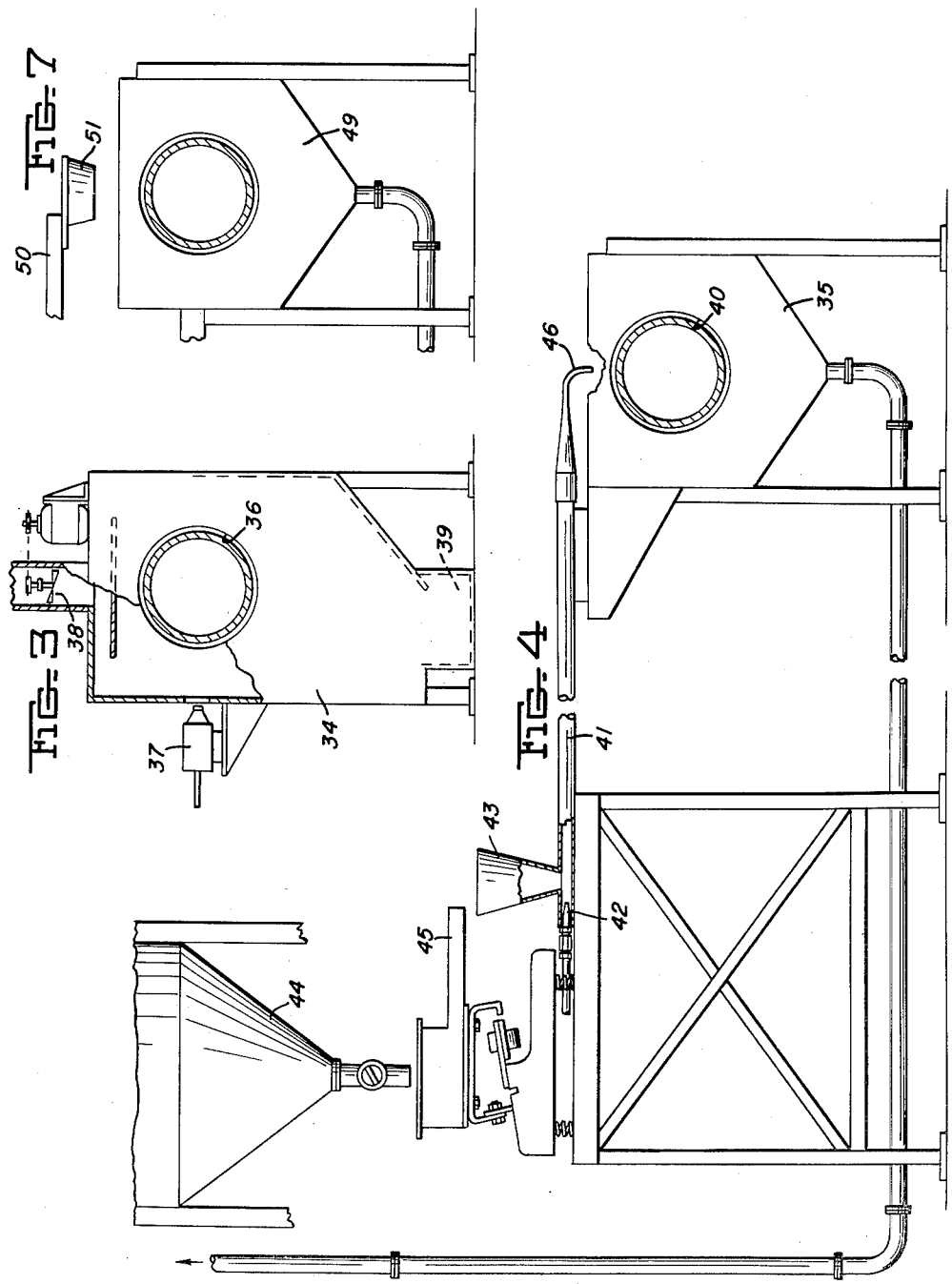

United States Patent Office 3,016,875
Patented Jan. 16, 1962

3,016,875
APPARATUS FOR COATING PIPE
William I. Ballentine, Jr., and Richard F. Lottes, Whittier, Calif., assignors to United States Steel Corporation, a corporation of New Jersey
Filed Dec. 11, 1958, Ser. No. 779,716
2 Claims. (Cl. 118—306)

This invention relates to the application of a protective coating to metal pipe and, in particular, to an apparatus for continuously coating both the interior and exterior of the pipe with a layer of thermoplastic resin such as polyvinyl chloride or polyvinyl chloride-acetate.

Numerous methods have been tried for protecting metal pipe, e.g., steel line pipe, from corrosion but all of them are subject to certain objections such as high cost and difficulties in manipulation or handling. We have invented an apparatus for applying to the exterior and interior of the pipe continuously while it travels axially, a heavy coating of a thermoplastic resin which forms a tough durable and adherent surface layer on cooling. Our invention takes advantage of the fact that certain resins such as polyvinyl chloride or polyvinyl chloride-acetate, suitable for the purpose, may now be obtained in the form of fine powder. In a preferred practice of our method, we heat the pipe after the necessary preliminary cleaning and then subject the interior and exterior to gas-borne streams of resin particles. The pipe is preferably first coated on the outside and inside with a primer, i.e., a solution of a synethetic resin in a volatile solvent. The resin particles, on striking the hot pipe, are fused into a continuous coating of uniform thickness which bonds to the pipe wall, after which the coated pipe may be cooled to facilitate further handling.

More specifically, to coat the interior of the pipe, we telescope it with a tube extending axially thereof, having a deflector nozzle spaced from one end and deliver the gas-borne stream of resin particles to the other end of the tube. This creates a fan-like spray of particles radially of the pipe in a plane normal to the axis thereof. In coating the exterior of the pipe we deliver a similar stream to a tube extending laterally from the pipe path and terminating in a nozzle which deflects the stream onto the pipe in the form of a fan disposed radially of the pipe and in a plane through its axis. By our invention, the exterior and interior are coated simultaneously. The apparatus we employ includes an extensible boom adapted to be run into the pipe, carrying the axial tube and deflector plate and means for supplying resin and conveying gas thereto and to the laterally extending tube for coating the exterior of the pipe.

A complete understanding of the invention may be obtained from the following detailed description and explanation which refer to the accompanying drawings illustrating the present preferred embodiment. In the drawings:

FIGURE 1 is a diagrammatic plan view of apparatus for coating pipe by our method;

FIGURE 2 is an elevation, partly broken away and partly in vertical section, showing the apparatus for coating the interior of the pipe with resin particles;

FIGURES 2A and 2B are partial sections taken along the lines IIA—IIA and IIB—IIB of FIGURE 2, respectively;

FIGURE 3 is an elevation partly broken away and partly in section of apparatus for applying primer to the exterior of the pipe which is shown in section;

FIGURE 4 is a similar view of apparatus for applying a coating of resin particles to the exterior of the pipe;

FIGURE 5 is a partial plan view of the deflector nozzle forming part of the apparatus of FIGURE 4;

FIGURE 6 is a side elevation therof; and

FIGURE 7 is a partial elevation of apparatus generally similar to that of FIGURE 4 for applying a second protective coating to the exterior of the pipe.

Referring now in detail to the drawings and, for the present, to FIGURE 1 in particular, metal pipe, e.g., steel line pipe, in convenient lengths, after being descaled exteriorly and interiorly as by shot-blasting, is delivered over skids 10 to a skewed-roller conveyor 11. Conveyor 11 advances the pipe axially at a uniform speed with simultaneous rotation about its own axis, and moves it through a continuous heating furnace 12 where the temperature of the pipe is raised to about 600° F. Furnace 12 may be of any suitable type such as a gas-fired luminous-wall furnace. After passing through the furnace, the pipe is delivered over skids 13 to a skewed-disc conveyor 14 effective to feed the pipe forward axially at a uniform speed of about 25 f.p.m. while rotating it about its own axis at about 80 r.p.m. The pipe is held momentarily in initial position on conveyor 14, however, before the latter is started. While the pipe is held in that position, the extensible boom indicated generally at 15 and shown in detail in FIGURE 2 is run into it or coating the interior.

As shown in FIGURE 2, the extensible boom 15 comprises a tube 16 having its rear end mounted on a carriage 17 adapted to travel along a rail 18 parallel to the axis of the pipe on conveyor 14. At its forward end, tube 16 has a terminal or nozzle portion 19 connected thereto by a coupling collar 20. A deflector disc 21 is mounted in spaced relation to the end of the nozzle portion. The disc is fixed to a rod 22 extending forwardly from a spider 23 positioned between the nozzle portion and the end of tube 16. Tube 16 is provided with a cooling jacket 24. Rollers 25 on the jacket traveling on the interior of the pipe or on a vertically adjustable rail 26 in alinement therewith, support the forward end of the boom.

The rear end of tube 16 is fitted with a nozzle 27 and a hopper 28. Resin particles are delivered from a bin 29 to a vibrating feeder 30 and thence into hopper 28 at a controlled rate. Nozzle 27 is connected to a source of gas under pressure such as an air compressor and the resulting jet creates a stream of resin particles through tube 16. On striking the plate 21, the particles are diverted radially of the pipe in a fan-like spray, whereby the interior of the pipe is uniformly coated. The particles impinging on the pipe wall generally normal thereto are fused by the heat thereof and coalesce or flow together to constitute a continuous surface layer.

A radially directed spray nozzle 31 mounted on boom 15 has supply pipes 32 and 33 for compressed air and primer solution. When the boom 15 has been properly positioned within the pipe, air and resin are admitted to tube 16 and air and primer to nozzle 31 and conveyor 14 is started to move the pipe axially relative to the boom while rotating it about its own axis. Connections are made to nozzle 27, pipes 32 and 33 and the inlet and outlet of jacket 24 by flexible hose. By the construction described, the interior of the pipe will be coated first with primer solution and then with resin particles. A suitable primer composition is:

19% resin (14% vinyl chloride, 5% phenol-formaldehyde)
61% solvent (26% toluene, 25% methylisobutyl ketone, 5% xylene and 5% isophorone)
2% modifier (1.5% tricresyl phosphate, 0.5% maleic anhydride)
Balance pigment (e.g., blue lead)
(All percentages by weight)

Our coating composition( more fully described and claimed in the copending application of Clayton I. Spessard, Serial No. 777,583, filed December 2, 1958) is prepared by mixing with resin powder from 5 to 40% of a liquid plasticizer and from 1 to 10% of a liquid stabilizer, both by weight of resin. A preferred composition is 80% resin powder, 16% plasticizer and 4% stabilizer. More specifically the resin powder is a combination of vinyl-chloride vinyl-acetate polymers, i.e., 38% VYHH, 38% VYNS and 4% VYCM, as designated by one manufacturer, The Bakelite Company. The fineness of the resin particles in a typical example is given by the following screen analysis:

25% smaller than 250 mesh
   30% smaller than 200 mesh
   50% smaller than 150 mesh
   70% smaller than 100 mesh
   90% smaller than  80 mesh
   100% smaller than  50 mesh The plasticizer may be any of the compounds known to be useful for the purpose in connection with the particular resin involved. Esters and polyesters of organic acids, particularly phthalic acid, are generally satisfactory plasticizers for polyvinyl resins. In the specific example, however, we employ a mixture of di-isodecyl phthalate, di-octyl phthalate and di-propylene glycol dibenzoate, in the ratio of 5:3:2 by weight.

The stabilizer may likewise be any available compound capable of desirably affecting the characteristics of the finished coating. As an example, the reaction product of epichlorhydrin and bisphenol A may be mentioned. This is a simple di-epoxide of approximately 192 epoxy equivalent. Preferably, we use a mixture of such product with dibutyl tin dilaurate in a 4:1 ratio by weight.

In addition to the resin, plasticizer and stabilizer, the coating composition may include inert fillers or pigments in amounts which do not substantially affect the characteristics of the finished coating.

As the pipe moves forward on conveyor 14, it passes through a booth 34 provided with means for spraying the aforesaid primer solution on the exterior of the pipe, as shown in FIGURE 3, and through a booth 35 having means for applying a coating of resin particles, as shown in FIGURE 4. Thus the pipe is coated simultaneously on the exterior and interior. Referring to FIGURE 3, booth 34 has sheet-metal walls with openings 36 adapted to admit the pipe. A spray nozzle 37 mounted on one side of the booth and connected to a supply of primer under pressure, discharges a wide thin spray thereof onto the pipe. An exhaust fan 38 withdraws solvent vapor from the booth and excess solution collects in a pan 39 at the bottom thereof.

Booth 35 is a sheet-metal enclosure open at the top, the walls of which have openings 40 for the passage of pipe therethrough. A tube 41 disposed above the level of the pipe path extends transversely thereof to a point adjacent said path. A gas-borne stream of resin particles is delivered through tube 41 by a jet from a nozzle 42 in the outer end thereof. Resin particles are delivered to a hopper 43 on the tube from a bin 44 by a vibrating feeder 45. The discharge end of tube 41 is fitted with a deflector nozzle 46 curving smoothly downward to a wide narrow mouth radial to the pipe and in a plane containing the axis thereof. The nozzle causes a wide thin fan-like spray of particles to be directed radially onto the pipe in line with the axis thereof.

It will be apparent that the arrangements described above for applying primer and resin particles to the exterior of the pipe, serve effectively to coat it uniformly as it advances axially while rotating. The finshed coating is formed in the same manner as that on the interior of the pipe, i.e., by fusion of the particles and coalescence thereof under the surface tension existing in the fused mass. The temperature to which the pipe is heated in traversing furnace 12 is controlled so that after the cooling by natural radiation and convection which inevitably ensues, and that resulting from the coating with primer, the pipe will be at a temperature between 400 and 500° F., preferably about 475° F., when the resin particles impinge thereon. Any particles which fail to adhere to the exterior of the pipe collect in the bottom of booth 35 and are returned to bin 44 through pipe 48 by air suction. Boom 15 is preferably so operated as to locate nozzle 31 with booth 34 and deflector plate 21 within booth 35 at the start of a coating operation. When so positioned, the boom, of course, remains stationary while the pipe advances and rotates. The boom is then retracted to clear the way for the next pipe.

While the resin coating applied as described above is characterized by good abrasion resistance, further protection against damage thereto by the cutting action or impact of rocks or the like may be afforded by applying an overcoating on top of the resin layer. This may easily be done in a booth 49 immediately adjacent booth 35 while the pipe is still hot. The details of booth 49 are similar to those of booth 35 except as shown in FIGURE 7. As there shown, a vibrating feeder 50 has a sifting screen 51 attached thereto above the path of the pipe. Thus, as the pipe moves axially through the booth while rotating, screen 51 deposits a granular material thereon. This material adheres to the resin layer because the latter is still soft and tacky. The overcoating material is preferably a mixture of 50% marble dust ($CaCO_3$), 25% vinyl resin powder and 25% ground pitch (percentages by weight).

The pipe having a resin coating over the primer coating on the interior and exterior and a coating of material protecting it against cuts and abrasion over the resin coating on the exterior, is next passed through a quench chamber 52 provided with nozzles directing water sprays onto it. The pipe is thus cooled quickly to atmospheric temperature so it may readily be handled in further processing operations incident to finishing and delivery to transport or storage facilities.

The invention has the advantage of depositing a uniform resin coating by virtue of the thin flat fan-like spray of particles discharged by tube 16 and deflector plate 21 onto the interior of the pipe and by tube 41 and deflector plates 46 and 47 onto the exterior of the pipe. In both cases, the resin particles strike the pipe surface substantially normal thereto and this insures uniformity of coating free from bare spots. The method is a true production-line process and permits the operation to be carried on at good speed. Once the pipe has been heated and placed on conveyor 14, its progress through the line is continuous, without requiring further manipulation. Since the resin coating is formed in situ and is finished almost immediately, no lengthy after-baking or curing is needed. The coating material is relatively low in cost, the investment represented by the necessary apparatus is not excessive and the man-power needed is small. The invention makes practical the coating of the interior of long pipe of small diameter and makes possible accurate control of the coating thickness. Booths 34, 35 and 49 and quench chamber 52 may be placed close together so that it becomes practical to support the pipe on conveyor discs ahead of booth 34 and beyond chamber 52, without requiring discs therebetween which would mar the coating before it sets to final condition.

Although we have disclosed herein the preferred embodiment and practice of our invention, we intend to cover as well any change or modification therein which may be made without departing from the spirit and scope of the invention

We claim:

1. Apparatus for coating pipe lengths comprising a conveyor for moving the lengths axially and simultaneously rotating them about their axes, means for delivering lengths sidewise onto said conveyor, a boom positioned in alinement with said conveyor and mounted for axial travel into and away from a pipe length thereon, said boom including a conduit having deflector means at one end for a gas-borne stream of coating particles traveling therethrough, particle-feeding and gas-jet means at the other end of said conduit, a spray nozzle carried on the exterior of said conduit inwardly of said one end and connections from said nozzle to sources of primer liquid and compressed gas, respectively, whereby, when said boom has been inserted in a pipe length, successive coatings of primer and particles are applied to the interior of the length on relative movement of the length and the boom opposite that by which the boom was inserted therein.

2. Apparatus as described in claim 1, characterized by supporting means on the boom adapted to travel on the interior of a pipe length resting on said conveyor.

References Cited in the file of this patent
UNITED STATES PATENTS

| | | |
|---|---|---|
| Re. 24,601 | Lewis | Feb. 17, 1959 |
| 2,262,184 | Ireton | Nov. 11, 1941 |
| 2,301,165 | Neal | Nov. 3, 1942 |
| 2,336,946 | Marden et al. | Dec. 14, 1943 |
| 2,373,638 | Perkins | Apr. 10, 1945 |
| 2,438,561 | Kearsley | Mar. 30, 1948 |
| 2,550,232 | Donnell et al. | Apr. 24, 1951 |
| 2,683,436 | Marantz | July 13, 1954 |
| 2,719,093 | Voris | Sept. 27, 1955 |
| 2,844,489 | Gemmer | July 22, 1958 |

FOREIGN PATENTS

| | | |
|---|---|---|
| 508,791 | Great Britain | July 3, 1939 |
| 579,442 | Great Britain | Aug. 2, 1946 |
| 631,840 | Great Britain | Nov. 10, 1949 |

OTHER REFERENCES

British Plastics, August 1950, pages 56–59.
Modern Plastics, September 1955, page 207.

UNITED STATES PATENT OFFICE
CERTIFICATE OF CORRECTION

Patent No. 3,016,875                      January 16, 1962

William I. Ballentine, Jr., et al.

It is hereby certified that error appears in the above numbered patent requiring correction and that the said Letters Patent should read as corrected below.

Column 2, line 22, for "or" read -- for --; column 6, line 14, for "631,840" read -- 631,850 --.

Signed and sealed this 1st day of May 1962.

(SEAL)
Attest:

ERNEST W. SWIDER
Attesting Officer

DAVID L. LADD
Commissioner of Patents